ALBERT H. MERSHON.
Improvement in Mode of Regulating the Draft of Hot Air Furnaces.
Reissued Nov. 21, 1871.
No. 4,644.
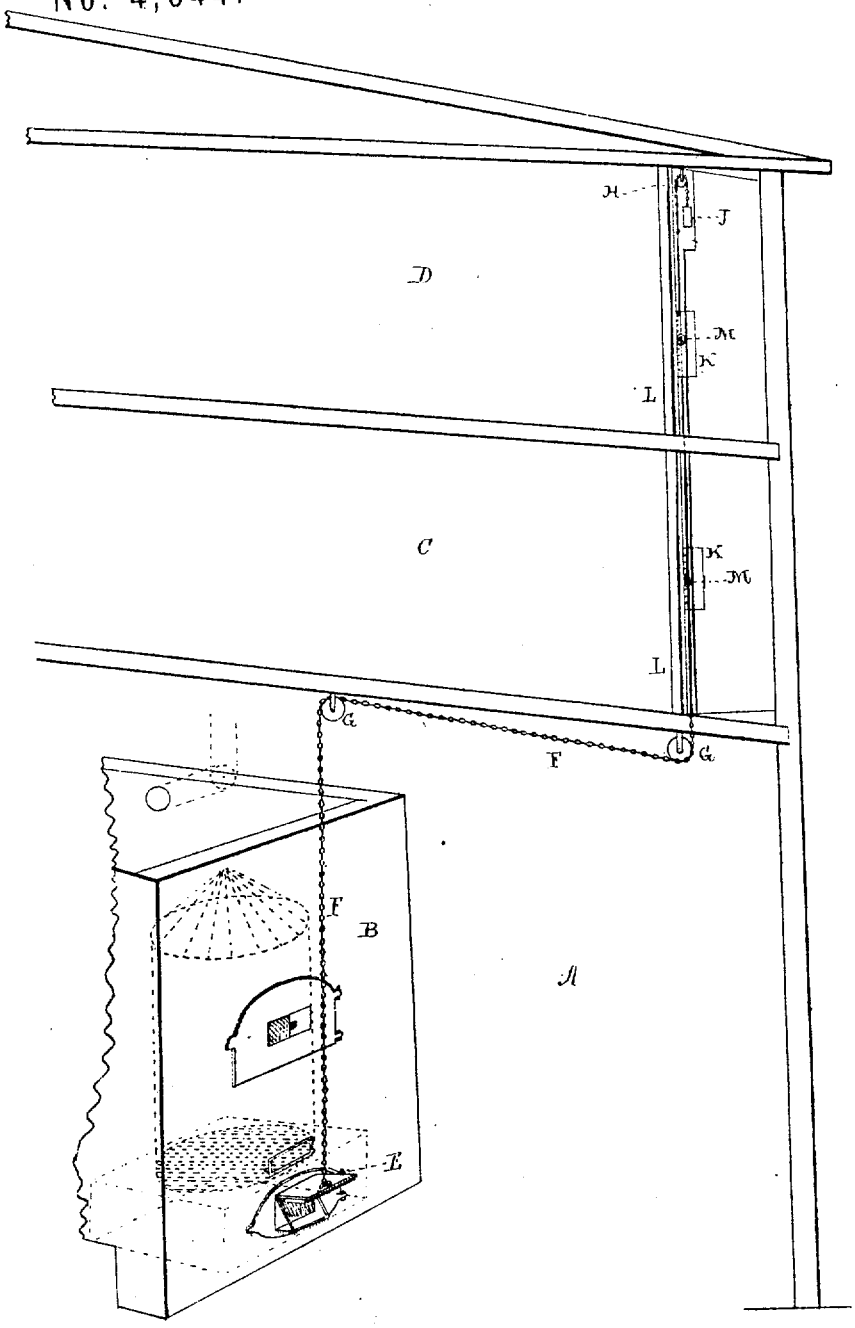
Witnesses:
James E. Schiedt
Geo. H. Knead
Inventor:
Albert H. Mershon
by John A. Dieterich
Atty.
AM. PHOTO-LITHOGRAPHIC CO. N.Y. (OSBORNE'S PROCESS.)

UNITED STATES PATENT OFFICE.

ALBERT H. MERSHON, OF PHILADELPHIA, PENNSYLVANIA.

IMPROVEMENT IN MODES OF REGULATING THE DRAUGHT OF HOT-AIR FURNACES.

Specification forming part of Letters Patent No. 55,138, dated May 29, 1866; reissue No. 4,644, dated November 21, 1871.

*To all whom it may concern:*

Be it known that I, ALBERT H. MERSHON, of the city and county of Philadelphia, State of Pennsylvania, have invented a new and useful Mode of Regulating the Fire of Furnaces; and I do hereby declare the following to be a clear and exact description of the nature thereof, sufficient to enable others skilled in the art to which my invention appertains to fully understand and use the same, reference being had to the accompanying drawing making part of this specification, in which the figure represents the perspective view of a furnace and of a building, (in section,) my invention being applied thereto.

This invention consists in mechanism for enabling persons on any floor of a building to regulate the fire of a furnace without the necessity of passing to the place of location of said furnace. It also consists in a gauge for exhibiting the state of the draught-door.

Referring to the drawing, A represents the place in which the heater B is located. C and D represent upper rooms of a building. E is the draught-door, which may be hinged or made to slide, and which, when not held up, will fall by its own weight. To the draught-door is attached a chain, F, which passes over pulley G, and is then extended with a wire to a continuation, which passes over a pulley, H, and carries a weight, J, arranged and adapted to balance the weight of the draught-door. A ring, M, may be fixed to the wire in each story, for conveniently handling the said wire. K represents a gauge, which is so located as to exhibit the position or amount of opening of the draught-door. In newly-constructed houses it is intended to have a partition, L, in the wall, for inclosing the wire, and a box or chamber to contain the gauge. It will be seen that when the wire or either floor is raised, the draught-door will be opened, and by lowering the said wire the door will be closed. Partial or entire opening or closing of the door will be readily indicated on reference to the gauge.

Having thus described my invention, what I claim as new, and desire to secure by Letters Patent, is—

1. Mechanism, operating substantially as described, for enabling persons on any floor of a building to regulate the fire of a furnace without passing to the place of location of said furnace.

2. A gauge or indicator, applied in combination with mechanism for operating the draught-door, substantially as and for the purpose described.

3. The chain F and weight J together, substantially as described, operating with a draught-door in the manner and for the purpose set forth.

A. H. MERSHON.

Witnesses:

JOHN A. WIEDERSHEIM,
PERCY V. KNEASS.

(154)